United States Patent
Kwon (10) Patent No.: US 11,130,496 B2
(45) Date of Patent: Sep. 28, 2021

(54) CLUTCH CONTROL METHOD AND SYSTEM FOR HYBRID VEHICLE WITH DCT

(71) Applicants: Hyundai Motor Company, Seoul (KR); Kia Motors Corporation, Seoul (KR)

(72) Inventor: Gi Young Kwon, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 258 days.

(21) Appl. No.: 16/539,713

(22) Filed: Aug. 13, 2019

(65) Prior Publication Data
US 2020/0307602 A1     Oct. 1, 2020

(30) Foreign Application Priority Data

Apr. 1, 2019   (KR) .................... 10-2019-0037828

(51) Int. Cl.
| B60W 40/06 | (2012.01) |
| B60W 30/18 | (2012.01) |
| F16D 48/06 | (2006.01) |
| B60K 6/36 | (2007.10) |
| B60W 20/40 | (2016.01) |
| B60W 10/113 | (2012.01) |

(52) U.S. Cl.
CPC .......... B60W 40/06 (2013.01); B60K 6/36 (2013.01); B60W 10/113 (2013.01); B60W 20/40 (2013.01); F16D 48/062 (2013.01); *B60W 2710/022* (2013.01); *B60W 2710/023* (2013.01)

(58) Field of Classification Search
None
See application file for complete search history.

(56) References Cited

U.S. PATENT DOCUMENTS

| 8,364,364 B1* | 1/2013 | Tao | F16H 59/18 |
| | | | 701/68 |
| 8,930,103 B2* | 1/2015 | Faust | F16D 48/0206 |
| | | | 701/58 |
| 8,996,266 B2* | 3/2015 | Hultengren | F16D 13/00 |
| | | | 701/60 |
| 2019/0249728 A1* | 8/2019 | Grosser | B60W 30/186 |

FOREIGN PATENT DOCUMENTS

KR    20150138761 A    12/2015

* cited by examiner

*Primary Examiner* — Todd Melton
(74) *Attorney, Agent, or Firm* — Mintz Levin Cohn Ferris Glovsky and Popeo, P.C.; Peter F. Corless

(57) ABSTRACT

A clutch control method for a hybrid vehicle with a DCT of the present invention is provided. The method includes checking whether a current shift range is a D-range and determining a gradient of a current driving road and driver's vehicle stop requirement. In response to determining that the current shift range is the D-range, the gradient of the road is not a gradient that requires uphill driving, and there is driver's vehicle stop requirement, a controller reduces an operation current supplied to a clutch actuator of a clutch for transmitting power to a first gear to a regulation current. The regulation current is set based on an operation of the vehicle by the driver when the vehicle is restarted after the current reduction.

20 Claims, 7 Drawing Sheets

| TOTAL COUNT | REGULATION CURRENT |
|---|---|
| < 2 | Base |
| > 2 | Base + opt |
| > 4 | Base + opt + offset |
| > 6 | Base + opt + offset + adp |
| ≤ 5 | Base + opt + offset |
| ≤ 3 | base + opt |
| ≤ 1 | Base |

CLUTCH CONTROL METHOD AND SYSTEM FOR HYBRID VEHICLE WITH DCT

CROSS REFERENCE TO RELATED APPLICATION

The present application claims priority to Korean Patent Application No. 10-2019-0037828, filed on Apr. 1, 2019, the entire contents of which is incorporated herein for all purposes by this reference.

BACKGROUND

Field of the Invention

The present invention relates to a clutch control method and system for a hybrid vehicle with a Dual Clutch Transmission (DCT), and more particularly, to a clutch control method that secures high acceleration responsiveness of a hybrid vehicle with a DCT.

Description of the Related Art

A DCT receives power through two input shafts connected to two clutches and may engage odd-numbered gear stages and even-numbered gear stages of a series of gear stages from a first gear stage to an N-th gear stage through the input shafts, respectively, to separate the two input shafts into an odd-numbered input shaft and an even-numbered input shaft. Accordingly, the two clutches may also be separated into an odd-numbered clutch connected to the odd-numbered input shaft and an even-numbered clutch connected to the even-numbered input shaft.

The two clutches of the DCT are operated by clutch actuators that are operated by electricity and the clutch actuators may also be divided into an even-numbered clutch actuator and an odd-numbered clutch actuator. When a driver intends to accelerate after a hybrid vehicle with a DCT is stopped, the odd-numbered clutch is operated to be engaged, with a first gear engaged to achieve high acceleration responsiveness of the vehicle in some cases. However, maintaining the application of an operation current to the odd-numbered clutch actuator to maintain the odd-numbered clutch engaged, as described above, decreases the fuel efficiency and the traveling distance of the hybrid vehicle.

The description provided above as a related art of the present disclosure is merely for helping understanding the background of the present disclosure and should not be construed as being included in the related art known by those skilled in the art.

SUMMARY

The present invention provides a clutch control method and system for a hybrid vehicle with a DCT, the method being able to secure high acceleration responsiveness of a hybrid vehicle with a DCT when a driver intends to accelerate after the vehicle is stopped, and being able to minimize reduction of fuel efficiency and traveling distance by minimizing power consumption as much possible.

According to one aspect, a clutch control method for a hybrid vehicle with a DCT may include: checking, by a controller, whether a current shift range is a drive (D)-range; determining, by the controller, a gradient of a current driving road and driver's vehicle stop requirement; in response to determining that the current shift range is the D-range, the gradient of the road is not a gradient that requires uphill driving, and there is driver's vehicle stop requirement, reducing, by the controller, an operation current supplied to a clutch actuator of a clutch for transmitting power to a first gear to a regulation current; and setting, by the controller, the regulation current based on an aspect of operating a vehicle by the driver when the vehicle is restarted after the current-adjustment.

The controller may be configured to determine that the gradient of the current driving road is a gradient that requires uphill driving when a signal value of an inclination angle sensor is greater than a predetermined first reference inclination angle, determine that the gradient is a gradient that requires flat-ground driving when the signal value is the first reference inclination angle or less and is a second reference inclination angle or greater, and determine that the gradient is a gradient that requires downhill driving when the signal value is less than the second reference inclination angle.

When an accelerator pedal depression extent by a driver is a predetermined reference acceleration extent or less and a brake pedal depression extent is a predetermined braking extent or more, the controller may be configured to determine that there is a stop intent of the driver. The clutch actuator of the clutch for transmitting power to the first gear may be an odd-numbered clutch actuator. The regulation current may be set in accordance with aspects of operating a brake pedal, an accelerator pedal, and a driving mode selector.

When the vehicle is restarted after the current adjustment, the controller may be configured to increase an acceleration count when the accelerator pedal is operated within a predetermined reference time after the brake pedal is released, and decrease the acceleration count when the accelerator pedal is not operated. The controller may then be configured to set the regulation current in proportion to the acceleration count in the current-setting process.

When the vehicle is restarted after the current adjustment, the controller may be configured to increase a mode count when a sports mode is selected through the driving mode selector before the brake pedal is released, and decrease the mode count when the driving mode selector is not operated or a mode other than the sports mode is selected. The controller may then be configured to set the regulation current in proportion to the mode count in the current-setting process.

When the vehicle is restarted after the current adjustment, the controller may be configured to increase an acceleration count when the accelerator pedal is operated within a predetermined reference time after the brake pedal is released, and decrease the acceleration count when the accelerator pedal is not operated. When the vehicle is restarted after the current adjustment, the controller may be configured to increase a mode count when a sports mode is selected through the driving mode selector before the brake pedal is released, and decrease the mode count when the driving mode selector is not operated or a mode other than the sports mode is selected. The controller may then be configured to set the regulation current in proportion to a total count that is a sum of the acceleration count and the mode count in the current-setting step.

As the total count increases, the controller may be configured to set the regulation current by sequentially adding an opt-current that is a current for operating a clutch with a touch point, an offset-current that is set in consideration of a design error of the clutch, and an adp-current that is a current according to a clutch design error-learning value to a base-current that is the lowest current. As the total count decreases, the controller may be configured to set the regulation current by subtracting the sequentially added currents from the regulation current in an inverse order.

As the total count increases, the controller may be configured to set a condition of the total count for sequentially adding the opt-current, the offset-current, and the adp-current to the base-current and a condition of the total count for subtracting the sequentially added currents from the regulation current in the inverse order to be different from each other such that hysteresis is given to an increase and decrease of the regulation current according to an increase and decrease of the total count.

According to the present disclosure, it may be possible to secure high acceleration responsiveness of a hybrid vehicle with a DCT when a driver intends to accelerate after the vehicle is stopped, and being able to minimize reduction of fuel efficiency and traveling distance by minimizing power consumption as much possible. In particular, it may be possible to further improve satisfaction of a driver with a vehicle by changing the relative importance of reduction of power consumption and an increase in acceleration responsiveness in accordance with the inclination of the driver.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
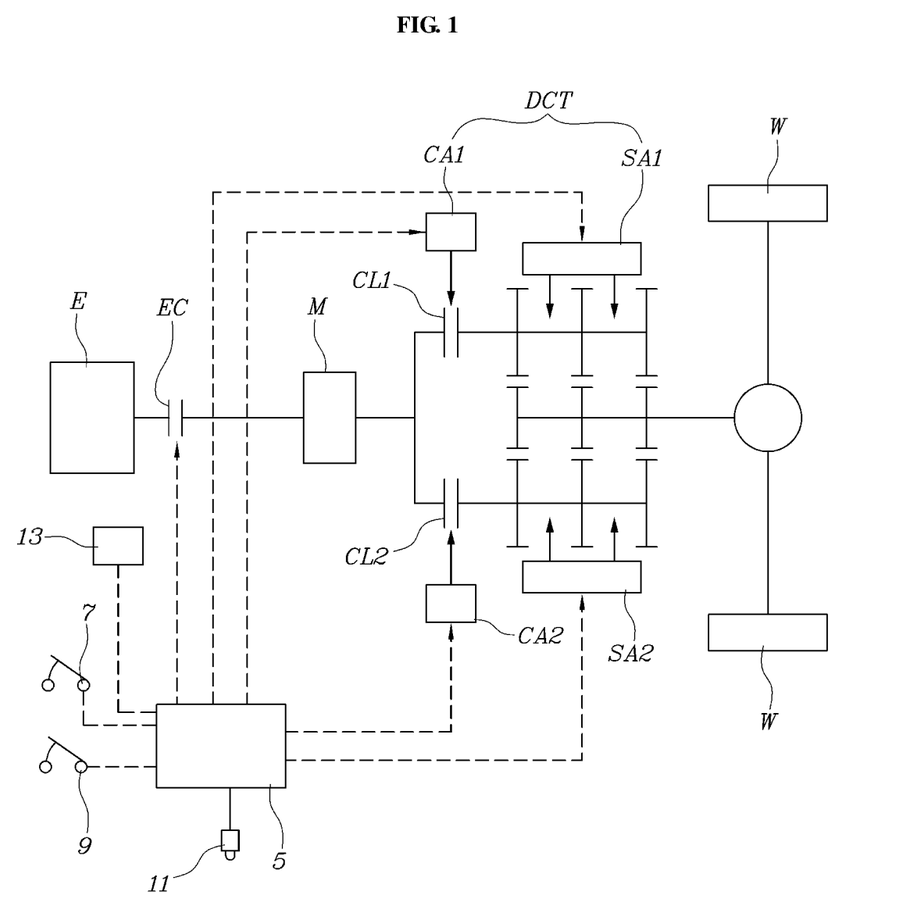
FIG. 1 is a view showing the configuration of a vehicle with a DCT according to an exemplary embodiment of the present invention.

Referring to FIG. 1, power from an engine E may be provided to driving wheels through a Dual Clutch Transmission (DCT), an odd-numbered clutch CL1 and an even-numbered clutch CL2 that are two clutches of the DCT are operated by an odd-numbered clutch actuator CA1 and an even-numbered clutch actuator CA2, respectively, gears of gear stages are engaged by shifting actuators SA1 and SA2 that selectively drive synchronizers, the actuators are operated by a controller 5, and the controller may be connected with an Accelerator Position Sensor (APS) 7 configured to receive an accelerator pedal depression extent or amount (e.g., amount of force exerted on the pedal), a Brake Pedal Sensor (BPS) 9 configured to receive a brake pedal depression extent or amount (e.g., amount of force exerted on the pedal), and an inclination angle sensor 11 configured to measure the gradient of a road surface on which a vehicle is driven.

A motor M may be connected to an input shaft of the DCT and connected to the engine E via an engine clutch EC, thereby configuring a hybrid powertrain. The controller 5 may be configured to receive information such as a shift range selection state, engine torque, and engine speed, and can receive a driving mode selection state by a driver such as a normal mode, an echo mode, a sports mode from a driving mode selector 13.

Referring to FIGS. 2 to 8, an exemplary embodiment of a clutch control method for a hybrid vehicle with a DCT according to the present invention may include: a range-checking step (S10) in which a controller 5 may be configured to check whether the current shift range is a drive (D)-range; a condition-determining step (S20) in which the controller 5 may be configured to determine the gradient of the current driving road and driver's vehicle stop requirement (e.g., driver stop intention); a current-adjusting step (S30) in which in response to determining that the current shift range is the D-range, the gradient of the road is not a gradient that requires uphill driving, and there is driver's vehicle stop requirement, the controller 5 may be configured to reduce an operation current supplied to a clutch actuator of a clutch for transmitting power to a first gear to a regulation current; and a current-setting step (S40) in which the controller 5 may be configured to set the regulation current based on the aspect of operating a vehicle by the driver when the vehicle is restarted after the current-adjusting step (S30).

Figure 2:
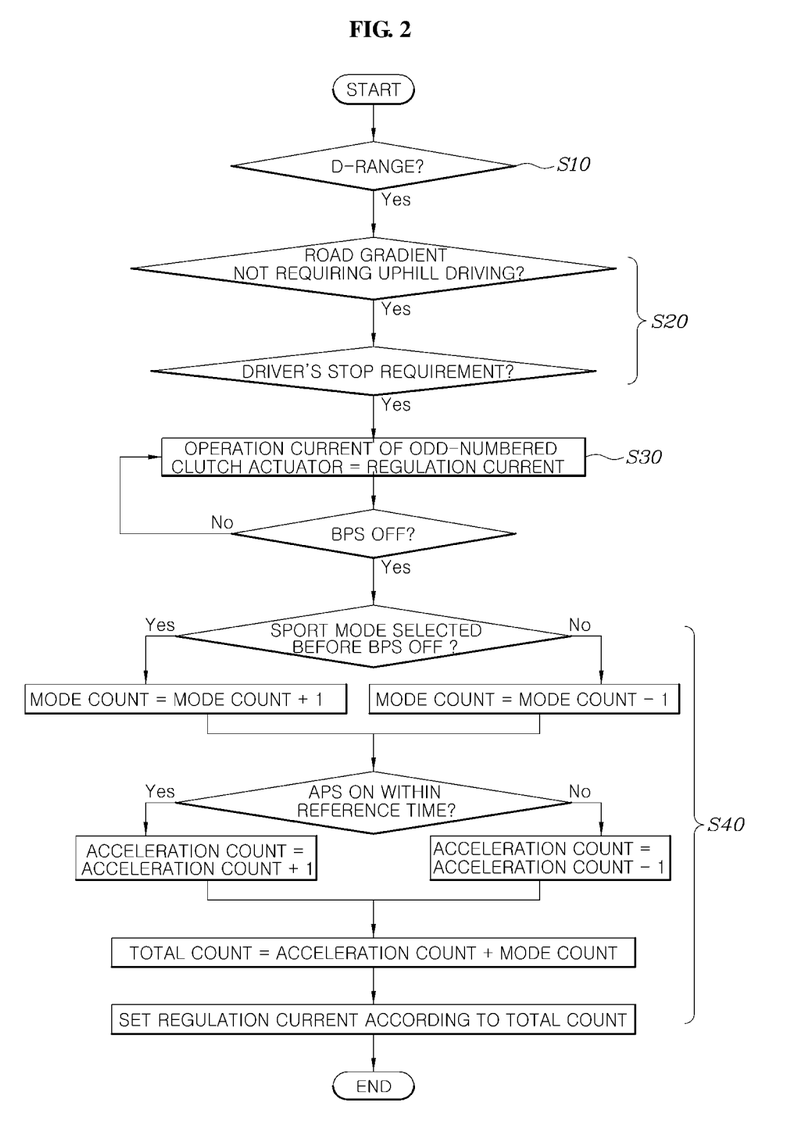
FIG. 2 is a flowchart showing a clutch control method for a hybrid vehicle with a DCT according to an exemplary embodiment of the present invention.

In other words, the present invention may minimize unnecessary power consumption and provide rapid responsiveness to driver's acceleration requirement in accordance with the inclination of the driver by reducing the operation current supplied to the clutch actuator (hereafter, an odd-numbered clutch actuator) for transmitting power to the first gear in response to determining that a vehicle is not driven uphill and the vehicle is stopped in the first gear in the D-range by driver's vehicle step requirement by generally considering the shift range, the gradient of a road, and driver's vehicle stop requirement.

The regulation current, that is, the operation current that is supplied to the odd-numbered clutch actuator may always be 0. However, in this case, it is relatively advantageous in reduction of power consumption, but it is relatively difficult to rapidly response to driver's rapid acceleration requirement. Accordingly, the regulation current may be changed based on operation of the vehicle by the driver through the current-setting step (S40) to maintain appropriate balance between reduction of power consumption and an increase in acceleration responsiveness.

Additionally, it may be possible to maintain the supply of the operation current to the odd-numbered clutch actuator, as in the related art, when the conditions of the shift range, the gradient of a road, and the driver's vehicle stop requirement are not satisfied to provide rapid responsiveness to driver's acceleration requirement. When the conditions are not satisfied and an operation current maintains the supply to the odd-numbered clutch actuator may be a case in which a driver requires acceleration, a case in which both feet are used to simultaneously operate an accelerator pedal and a brake pedal, or a case in which creeping is performed without both of the accelerator pedal and brake pedal operated, and, in these cases, rapid responsiveness according to the driver's acceleration requirement may be secured.

Therefore, according to the present disclosure, it may be possible to improve the fuel efficiency and traveling distance of a vehicle by reducing power consumption by a hybrid vehicle and to provide rapid acceleration responsiveness when the vehicle is reaccelerated after being stopped, thereby being able to maximize the commercial value of the vehicle. The controller 5 may be configured to determine that the gradient of a current driving road is a gradient that requires uphill driving when a signal value of the inclination angle sensor 11 is greater than a predetermined first reference inclination angle, determine that the gradient is a gradient that requires flat-ground driving when the signal value is the first reference inclination angle or less and is a second reference inclination angle or greater, and determine that the gradient is a gradient that requires downhill driving when the signal value is less than the second reference inclination angle.

In other words, the first reference inclination angle is greater than the second reference inclination angle, and when the signal value of the inclination angle sensor 11 is less than the first reference inclination angle, the controller 5 may be configured to determine that the road gradient condition for stopping an operation current for the odd-numbered clutch actuator is satisfied. Accordingly, the first reference inclination angle and the second reference inclination angle may be set in design to satisfy the intent of the present disclosure through experiments and analysis in accordance with the characteristics of an inclination angle sensor 11.

When the accelerator pedal depression extent by a driver is a predetermined reference acceleration extent or less and the brake pedal depression extent is a predetermined braking extent or more, the controller 5 may be configured to determine that the driver intends to stop the vehicle. The controller 5 may be configured to determine the operation state of the accelerator pedal by a driver based on a signal from the APS, determine the operation state of the brake pedal by the driver based on a signal from the BPS, and determine the gradient of a road based on a signal from the inclination angle sensor. Further, the controller 5 may be configured to determine whether the driver intends to stop the vehicle based on the APS signal and the BPS signal.

Accordingly, when the APS signal is the reference acceleration extent or less and the BPS signal is the reference braking extent or more, the controller 5 may be configured to determine that the driver intends to stop the vehicle. The reference acceleration extent and the reference braking extent may be appropriately set, for example, to 5% and 30%, respectively, through experiments and analysis according to the characteristics of the sensor so that the driver's stop requirement may be definitely checked in consideration of errors etc. of the APS or the BPS. Although the clutch actuator of the clutch for transmitting power to the first gear is described as an odd-numbered clutch actuator, it is not limited thereto and actually refers to a clutch actuator installed to operate the clutch connected to the input shaft to engage the first gear of the DCT.

Figure 3:
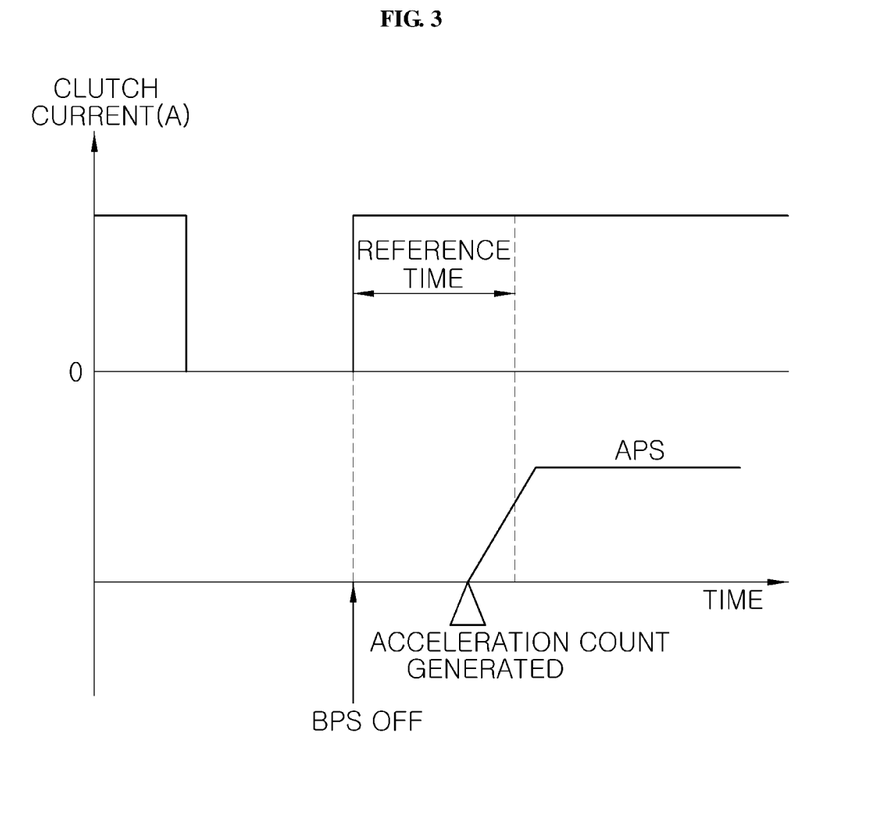
FIG. 3 is a graph illustrating when an acceleration count is generated and increased in an exemplary embodiment of the present invention.

In the current-setting step (S40), the regulation current may be set in accordance with the operation of the brake pedal, the accelerator pedal, and the driving mode selector 13 by the driver, and the maximum of the regulation current may be set as a current that is less than the current of the odd-numbered clutch actuator where an odd-numbered clutch is completely engaged in accordance with the intent to reduce power consumption of the present invention. For example, when the vehicle is restarted after the current-adjusting step (S30), as shown in FIG. 3, the controller 5 may be configured to increase an acceleration count when the accelerator pedal is operated within a predetermined reference time after the brake pedal is released, and decrease the acceleration count when the accelerator pedal is not operated. Further, in the current-setting step (S40), the controller 5 may be configured to set the regulation current in proportion to the acceleration count.

Particularly, the reference time may be set as time for which the odd-numbered clutch is sufficiently engaged and the vehicle may be stably started when the current of the odd-numbered clutch actuator is adjusted to the regulation current and then increased to a current at a level where the odd-numbered clutch is completely engaged to restart the vehicle by the current-adjusting step (S30). Further, the reference time may be determined through experiments and analysis in accordance with this intent, for example, as about 0.3 seconds.

As described above, when a driver restarts the vehicle after the current-adjusting step (S30) and operates the accelerator pedal within the reference time, it may be considered as that the driver intends to rapidly start the vehicle. Therefore, according to the present invention, the acceleration count may be increased such that the regulation current is slightly further increased in the next current-adjusting step (S30) based on estimation that it may be preferable to increase the acceleration responsiveness of the vehicle rather than reducing power consumption for the driver in this case.

Figure 4:
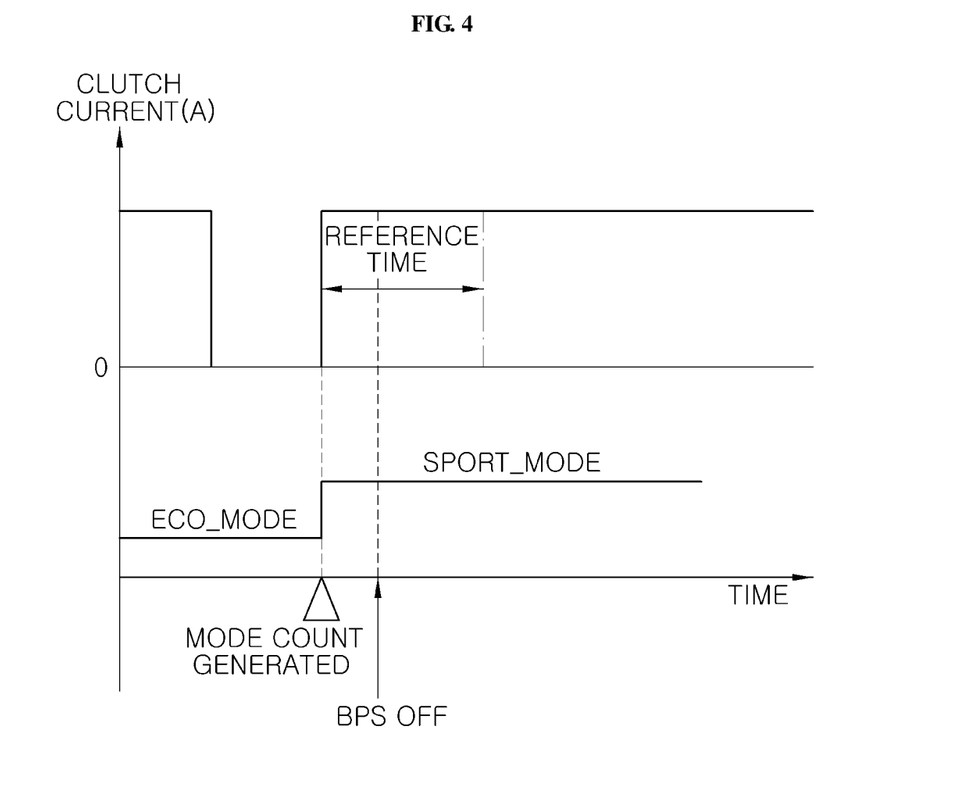
FIG. 4 is a graph illustrating when a mode count is generated and increased in an exemplary embodiment of the present invention.

Further, when the vehicle is restarted after the current-adjusting step (S30), the controller 5 may be configured to increase a mode count when the sports mode is selected through the driving mode selector 13 before the brake pedal is released, as shown in FIG. 4, and decrease the mode count when the driving mode selector 13 is not operated or a mode other than the sports mode is selected. Further, the controller 5 may also be configured to set the regulation current in proportion to the mode count in the current-setting step (S40).

In other words, when a driver selects the sports mode even before releasing the brake pedal, it may be estimated that the driver has an inclination for regarding the acceleration responsiveness of the vehicle as important when restarting the vehicle. Accordingly, in this case, the mode count may be increased based on the estimation such that the odd-numbered clutch actuator is operated based on the further increased regulation current in the current-adjusting step (S30).

The acceleration count and the mode counter are both considered in the exemplary embodiment and the controller 5 may be configured to increase the acceleration count when the vehicle is restarted after the current-adjusting step (S30) and the accelerator pedal is operated within the predetermined reference time after the brake pedal is released, and decrease the acceleration count when the accelerator pedal is not operated or is released.

Further, the controller 5 may be configured to increase the mode count when the vehicle is restarted after the current-adjusting step (S30) and the sports mode is selected through the driving mode selector 13 before the brake pedal is released, and decrease the mode count when the driving mode selector 13 is not operated or a mode other than the sports mode is selected. In the current-setting step (S40), the controller may be configured to set the regulation current in proportion to a total count that is the sum of the acceleration count and the mode count.

As the total count increases, the controller 5 may be configured to set the regulation current by sequentially adding an opt-current that is a current for operating a clutch with a touch point, an offset-current that is set in consideration of a design error of the clutch, and an adp-current that is a current according to a clutch design error-learning value to a base-current that is the lowest current. Further, as the total count decreases, the controller 5 may be configured to set the regulation current by subtracting the sequentially added currents from the regulation current in the inverse order.

Figure 5:
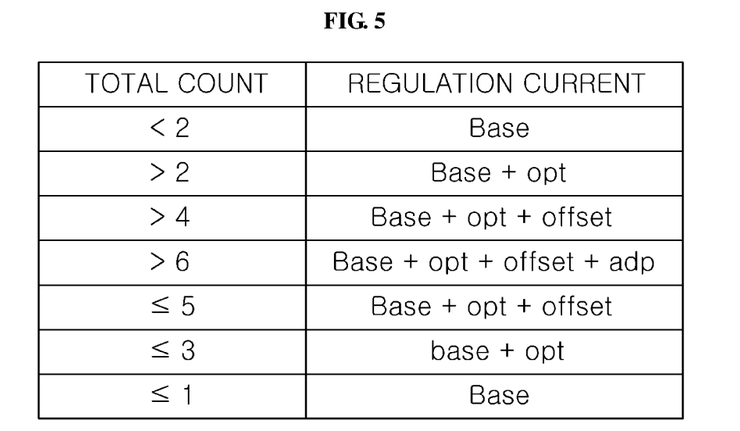
FIG. 5 is a table showing when a regulation current is set in accordance with a total count in an embodiment of the present invention.

FIG. 5 is a table showing an example in which a regulation current is set in accordance with an increase and decrease of the total count. In other words, when the total count is less than 2, the regulation current may be set as the base-current, and when the total count becomes greater than 2, the regulation current may be set as a value corresponding to the sum of the base-current and the opt-current.

The base-current may be set minimally as 0 (A) and the maximum of the regulation current that is the sum of the base-current, the opt-current, the offset-current, and the adp-current, as described above, is a current that is less than the current of the odd-numbered clutch actuator where the odd-numbered clutch is completely engaged in accordance with the intent to reduce power consumption of the present invention Additionally, the base-current, opt-current, offset-current, and adp-current may be determined in design by several experiments and analysis in accordance with the model of the vehicle. Further, the regulation current may be set by not sequentially adding the opt-current, offset-current, and adp-current to the base-current, as described above, but increasing or decreasing it in increments or decrements of a predetermined current value.

Figure 6:
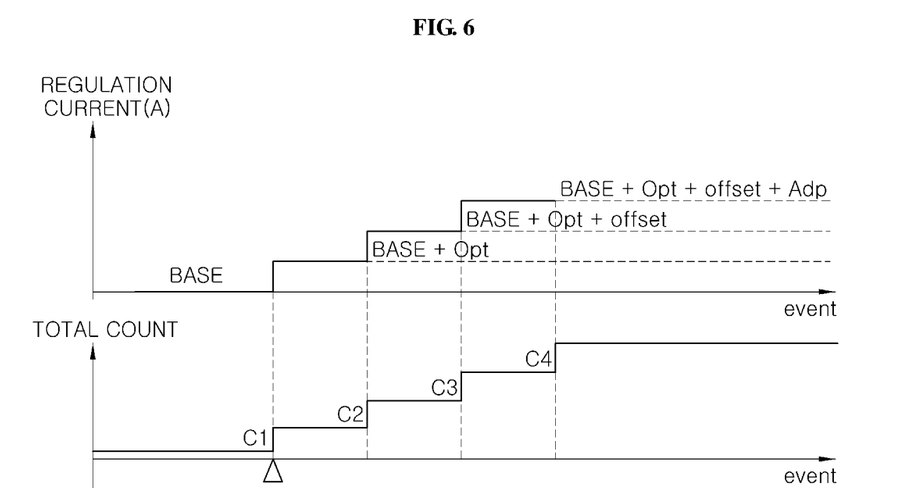
FIG. 6 is a graph when a regulation current is set to increase in accordance with an increase of a total count in an exemplary embodiment of the present invention.

For reference, FIG. 6 is a graph when a regulation current is set to increase in accordance with an increase of the total count, in which C1 to C4 are total count values that are the reference for increasing or decreasing the regulation current, similar to 2, 4, 6, etc. in FIG. 5. As the total count increases, the controller 5 may be configured to set the condition of the total count for sequentially adding the opt-current, offset-current, and adp-current to the base-current and the condition of the total count for subtracting the sequentially added currents from the regulation current in the inverse order to be different from each other such that hysteresis is given to an increase and decrease of the regulation current according to an increase and decrease of the total count.

Figure 7:
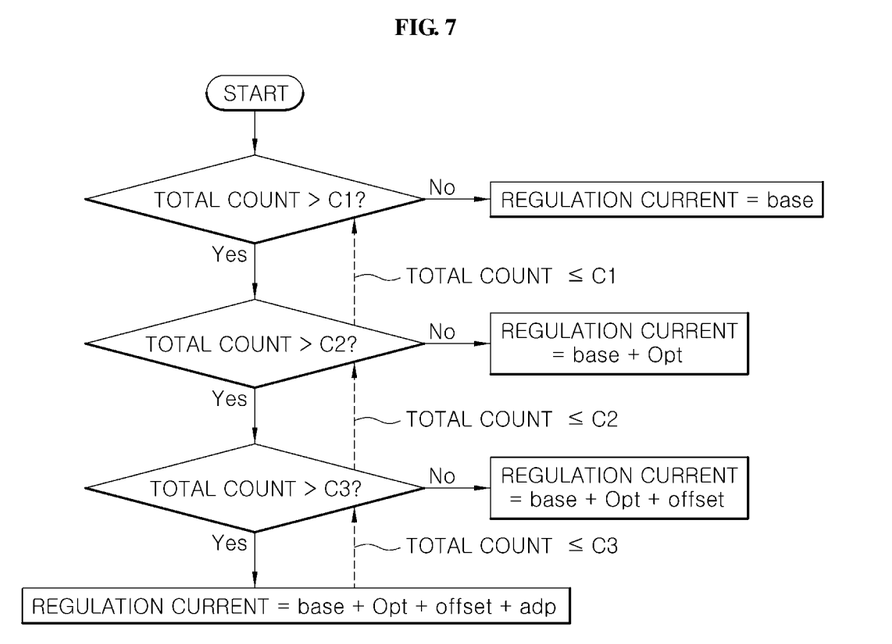
FIG. 7 is a view illustrating the case when an increase and decrease of a regulation current has hysteresis in accordance with an increase and decrease of a total count in an exemplary embodiment of the present invention.

FIG. 7 is a view illustrating the case when an increase and decrease of a regulation current has hysteresis in accordance with an increase and decrease of a total count, as described above. For example, the regulation current may be [base-current+opt-current+offset-current+adp-current] when the total count becomes greater than 3, and may be [base-current+opt-current+offset-current] only when the total count changes to 3 or less, thereby preventing unstable and frequent changes of the regulation value according to changes of the total count.

Figure 8:
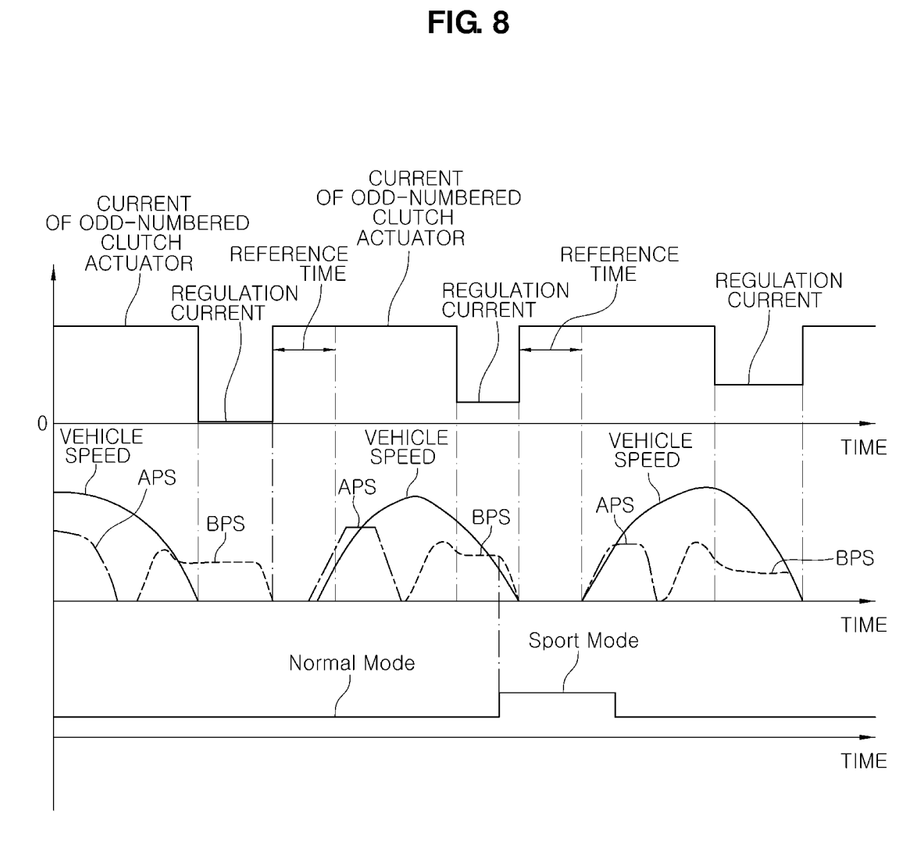
FIG. 8 is a view showing an example to which the clutch control method for a hybrid vehicle with a DCT according to an exemplary embodiment of the present invention is applied.

FIG. 8 is a graph showing an example when a vehicle to which the present invention is applied is driven. The initial value of the regulation current may be set as the base-current and then may be changed to other values in accordance with learning of the driver's inclination.

Referring to FIG. 8, when a driver releases the accelerator pedal and stops the vehicle by pressing down or engaging the brake pedal in the early stage, the controller 5 may be configured to determine that the shift range is the D-range and the road gradient is not a gradient that requires uphill driving, and adjust the current of the odd-numbered clutch actuator to the regulation current by performing the current-adjusting step (S30), in which the initial value of the regulation current is the base-current and the actual value is 0 A.

Thereafter, when the vehicle is restarted, the accelerator pedal is operated and an APS signal is generated within the reference time, the controller 5 may be configured to increase the acceleration count by 1 and accordingly the total count may also increase by 1. Thereafter, when the controller 5 performs the current-adjusting step (S30), the regulation current may be slightly further increased. Thereafter, since the driver has changed the driving mode of the vehicle into the sports mode before a BPS signal becomes 0 by release of the brake pedal when restarting the vehicle, the controller 5 may be configured to increase the mode count by 1 and accordingly the total count may increase by 1. Further, the regulation current may be further increased later in the current-adjusting step (S30).

In this state, the acceleration responsiveness to the driver's acceleration intention may be secured much more than the early stage when the regulation current is 0, but the power consumption is increased. In contrast, in the early stage when the regulation current is 0, the power consumption is maximally reduced, but the responsiveness to the driver's acceleration requirement may be slightly deteriorated.

For reference, FIG. 8 is a view for illustrating the concept that the acceleration count and the mode count are increased, and accordingly, the total count is increased and the regulation current is changed, but the change of the regulation current according to the change of the total count does not necessarily follow the detailed values exemplified in FIG. 5.

Although the present invention was described with reference to exemplary embodiments shown in the drawings, it is apparent to those skilled in the art that the present invention may be changed and modified in various ways without departing from the scope of the present invention, which is described in the following claims.

What is claimed is:

1. A clutch control method for a hybrid vehicle with a dual-clutch transmission (DCT), comprising:
checking, by a controller, whether a current shift range is a drive (D)-range;
determining, by the controller, a gradient of a current driving road and driver's vehicle stop requirement;
in response to determining that the current shift range is the D-range, the gradient of the road is not a gradient that requires uphill driving, and there is driver's vehicle stop requirement, reducing, by the controller, an operation current supplied to a clutch actuator of a clutch for transmitting power to a first gear to a regulation current; and
setting, by the controller, the regulation current based on an operation of the vehicle by a driver when the vehicle is restarted after the operation current reduction.

2. The method of claim 1, further comprising:
determining, by the controller, that the gradient of the current driving road is a gradient that requires uphill driving when a signal value of an inclination angle sensor is greater than a predetermined first reference inclination angle;
determining, by the controller, that the gradient is a gradient that requires flat-ground driving when the signal value is the first reference inclination angle or less and is a second reference inclination angle or more; and
determining, by the controller, that the gradient is a gradient that requires downhill driving when the signal value is less than the second reference inclination angle.

3. The method of claim 1, further comprising:
determining, by the controller, the driver's stop requirement when an accelerator pedal depression extent by the driver is a predetermined reference acceleration extent or less and a brake pedal depression extent is a predetermined braking extent or more.

4. The method of claim 1, wherein the clutch actuator of the clutch for transmitting power to the first gear is an odd-numbered clutch actuator.

5. The method of claim 1, wherein the regulation current is set in accordance with aspects of operating a brake pedal, an accelerator pedal, and a driving mode selector.

6. The method of claim 5, further comprising:
increasing, by the controller, an acceleration count when the accelerator pedal is operated within a predetermined reference time after the brake pedal is released and decreasing the acceleration count when the accelerator pedal is not operated when the vehicle is restarted after the current-adjusting step; and
setting, by the controller, the regulation current in proportion to the acceleration count in the setting of the regulation current.

7. The method of claim 5, further comprising:
increasing, by the controller, a mode count when a sports mode is selected through the driving mode selector before the brake pedal is released, and decreasing the mode count when the driving mode selector is not operated or a mode other than the sports mode is selected when the vehicle is restarted after the operation current is reduced; and
setting, by the controller, the regulation current in proportion to the mode count in the setting of the regulation current.

8. The method of claim 5, further comprising when the vehicle is restarted after the operation current is reduced:
increasing, by the controller, an acceleration count when the accelerator pedal is operated within a predetermined reference time after the brake pedal is released, and decreasing the acceleration count when the accelerator pedal is not operated;
increasing, by the controller, a mode count when a sports mode is selected through the driving mode selector before the brake pedal is released, and decreasing the mode count when the driving mode selector is not operated or a mode other than the sports mode is selected; and
setting, by the controller, the regulation current in proportion to a total count that is a sum of the acceleration count and the mode count in the setting of the regulation current.

9. The method of claim 8, further comprising:
as the total count increases, setting, by the controller, the regulation current by sequentially adding an opt-current that is a current for operating a clutch with a touch point, an offset-current that is set in consideration of a design error of the clutch, and an adp-current that is a current according to a clutch design error-learning value to a base-current that is the lowest current; and
as the total count decreases, setting, by the controller, the regulation current by subtracting the sequentially added currents from the regulation current in an inverse order.

10. The method of claim 9, further comprising:
as the total count increases, setting, by the controller, a condition of the total count for sequentially adding the opt-current, the offset-current, and the adp-current to the base-current and a condition of the total count for subtracting the sequentially added currents from the regulation current in the inverse order to be different from each other such that hysteresis is given to an increase and decrease of the regulation current according to an increase and decrease of the total count.

11. A clutch control system for a hybrid vehicle with a dual-clutch transmission (DCT), comprising:
a memory configured to store program instructions; and
a processor configured to execute the program instructions, the program instructions when executed configured to:
check whether a current shift range is a drive (D)-range;
determine a gradient of a current driving road and driver's vehicle stop requirement;
in response to determining that the current shift range is the D-range, the gradient of the road is not a gradient that requires uphill driving, and there is driver's vehicle stop requirement, reduce an operation current supplied to a clutch actuator of a clutch for transmitting power to a first gear to a regulation current; and set the regulation current based on an operation of the vehicle by a driver when the vehicle is restarted after the operation current reduction.

12. The system of claim 11, wherein the program instructions when executed are further configured to:

determine that the gradient of the current driving road is a gradient that requires uphill driving when a signal value of an inclination angle sensor is larger than a predetermined first reference inclination angle;

determine that the gradient is a gradient that requires flat-ground driving when the signal value is the first reference inclination angle or less and is a second reference inclination angle or more; and determine that the gradient is a gradient that requires downhill driving when the signal value is less than the second reference inclination angle.

13. The system of claim 11, wherein the program instructions when executed are further configured to:

determine the driver's stop requirement when an accelerator pedal depression extent by the driver is a predetermined reference acceleration extent or less and a brake pedal depression extent is a predetermined braking extent or more.

14. The system of claim 11, wherein the clutch actuator of the clutch for transmitting power to the first gear is an odd-numbered clutch actuator.

15. The system of claim 11, wherein the regulation current is set in accordance with aspects of operating a brake pedal, an accelerator pedal, and a driving mode selector.

16. The system of claim 15, wherein the program instructions when executed are further configured to:

increase an acceleration count when the accelerator pedal is operated within a predetermined reference time after the brake pedal is released and decrease the acceleration count when the accelerator pedal is not operated when the vehicle is restarted after the current-adjusting step; and set the regulation current in proportion to the acceleration count in the setting of the regulation current.

17. The system of claim 15, wherein the program instructions when executed are further configured to:

increase a mode count when a sports mode is selected through the driving mode selector before the brake pedal is released, and decrease the mode count when the driving mode selector is not operated or a mode other than the sports mode is selected when the vehicle is restarted after the operation current is reduced; and set the regulation current in proportion to the mode count in the setting of the regulation current.

18. The system of claim 15, wherein the program instructions when executed are further configured to:

increase an acceleration count when the accelerator pedal is operated within a predetermined reference time after the brake pedal is released, and decrease the acceleration count when the accelerator pedal is not operated;

increase a mode count when a sports mode is selected through the driving mode selector before the brake pedal is released, and decrease the mode count when the driving mode selector is not operated or a mode other than the sports mode is selected; and set the regulation current in proportion to a total count that is a sum of the acceleration count and the mode count in the setting of the regulation current.

19. The system of claim 18, wherein the program instructions when executed are further configured to:

as the total count increases, set the regulation current by sequentially adding an opt-current that is a current for operating a clutch with a touch point, an offset-current that is set in consideration of a design error of the clutch, and an adp-current that is a current according to a clutch design error-learning value to a base-current that is the lowest current; and as the total count decreases, set the regulation current by subtracting the sequentially added currents from the regulation current in an inverse order.

20. The system of claim 19, wherein the program instructions when executed are further configured to:

as the total count increases, set a condition of the total count for sequentially adding the opt-current, the offset-current, and the adp-current to the base-current and a condition of the total count for subtracting the sequentially added currents from the regulation current in the inverse order to be different from each other such that hysteresis is given to an increase and decrease of the regulation current according to an increase and decrease of the total count.

* * * * *